(12) United States Patent
Iwanaga

(10) Patent No.: US 12,071,928 B2
(45) Date of Patent: Aug. 27, 2024

(54) CONDITION MONITORING SYSTEM AND WIND POWER GENERATION SYSTEM INCLUDING THE SAME

(71) Applicant: NTN CORPORATION, Osaka (JP)

(72) Inventor: Hiroyuki Iwanaga, Kuwana (JP)

(73) Assignee: NTN CORPORATION, Osaka (JP)

( * ) Notice: Subject to any disclaimer, the term of this patent is extended or adjusted under 35 U.S.C. 154(b) by 134 days.

(21) Appl. No.: 17/600,524

(22) PCT Filed: Mar. 10, 2020

(86) PCT No.: PCT/JP2020/010213
§ 371 (c)(1),
(2) Date: Sep. 30, 2021

(87) PCT Pub. No.: WO2020/203082
PCT Pub. Date: Oct. 8, 2020

(65) Prior Publication Data
US 2022/0213872 A1    Jul. 7, 2022

(30) Foreign Application Priority Data

Apr. 1, 2019 (JP) .................................. 2019-069662

(51) Int. Cl.
*F03D 17/00* (2016.01)

(52) U.S. Cl.
CPC .......... *F03D 17/00* (2016.05); *F05B 2260/80* (2013.01); *F05B 2270/304* (2013.01);
(Continued)

(58) Field of Classification Search
CPC . F03D 17/00; F03D 7/00; F03D 7/045; F05B 2260/80; F05B 2260/821;
(Continued)

(56) References Cited

U.S. PATENT DOCUMENTS

| 8,450,867 B2 * | 5/2013 | Fukami | F03D 7/0204 |
| | | | 290/55 |
| 10,725,794 B2 * | 7/2020 | Nasu | G05B 19/05 |

(Continued)

FOREIGN PATENT DOCUMENTS

| CN | 102900600 A | 1/2013 |
| CN | 103899482 A | 7/2014 |

(Continued)

OTHER PUBLICATIONS

International Search Report issued in corresponding International Patent Application No. PCT/JP2020/010213, dated Jun. 16, 2020, with English translation.

(Continued)

*Primary Examiner* — Dapinder Singh
(74) *Attorney, Agent, or Firm* — Rimon P.C.

(57) ABSTRACT

A condition monitoring system comprises a measurement device and a processing server. The measurement device measures a condition of an apparatus provided for a wind power generation facility. The processing server associates measurement data measured by the measurement device with load data representing an operating load of the wind power generation facility acting at a time when the measurement data is measured and cumulative load data representing a cumulative operating load accumulated up to the time when the measurement data is measured, to generate a data set of the load data, the cumulative load data, and the measurement data for the time when the measurement data is measured.

5 Claims, 12 Drawing Sheets

(52) U.S. Cl.
CPC ... *F05B 2270/331* (2013.01); *F05B 2270/334* (2013.01); *F05B 2270/404* (2013.01); *F05B 2270/70* (2013.01)

(58) Field of Classification Search
CPC ............ F05B 2260/83; F05B 2270/304; F05B 2270/331; F05B 2270/334; F05B 2270/404; F05B 2270/70; F05B 2270/321; G05B 2219/2619; G05B 23/0221; G05B 23/024; G05B 23/0283; G05B 23/0254; G05B 23/0235; G05B 23/02; G05B 23/0272; G05B 15/02; G05B 17/02; Y02E 10/727; Y02E 10/728; Y02E 10/76
See application file for complete search history.

(56) References Cited

U.S. PATENT DOCUMENTS

| | | |
|---|---|---|
| 2013/0187783 A1 | 7/2013 | Hu et al. |
| 2015/0116131 A1* | 4/2015 | Ikeda ................. G05B 23/0235 340/870.07 |
| 2016/0154406 A1* | 6/2016 | Im ..................... G05B 23/0221 702/188 |
| 2017/0130700 A1 | 5/2017 | Sakaguchi et al. |
| 2019/0101103 A1 | 4/2019 | Haseba et al. |

FOREIGN PATENT DOCUMENTS

| | | |
|---|---|---|
| CN | 107524572 A | 12/2017 |
| CN | 108780025 A | 11/2018 |
| EP | 2824324 A1 | 1/2015 |
| EP | 3093486 A1 | 11/2016 |
| JP | 2013-185507 A | 9/2013 |
| JP | 2016-008536 A | 1/2016 |
| JP | 2016-217133 A | 12/2016 |
| JP | 6405486 B1 | 10/2018 |

OTHER PUBLICATIONS

Extended European Search Report issued in corresponding European Patent Application No. Application 20784089.3, dated Nov. 2, 2022.

Mi Lin et al., "A Gearbox for Wind Turbine Operation Condition Monitoring System Design", Journal of Chongqing University of Technology(Natural Science), Aug. 15, 2012, vol. 26, No. 8, pp. 27-30 w/English Abstract.

Office Action issued in corresponding Chinese Patent Application No. 202080026761.8, dated Nov. 6, 2023 w/English Translation.

* cited by examiner

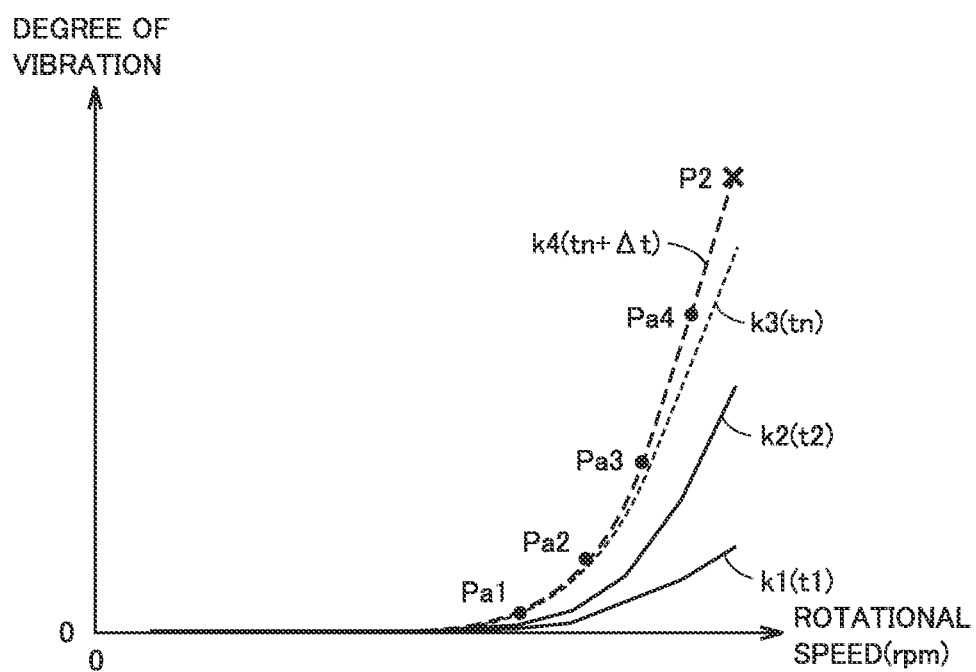

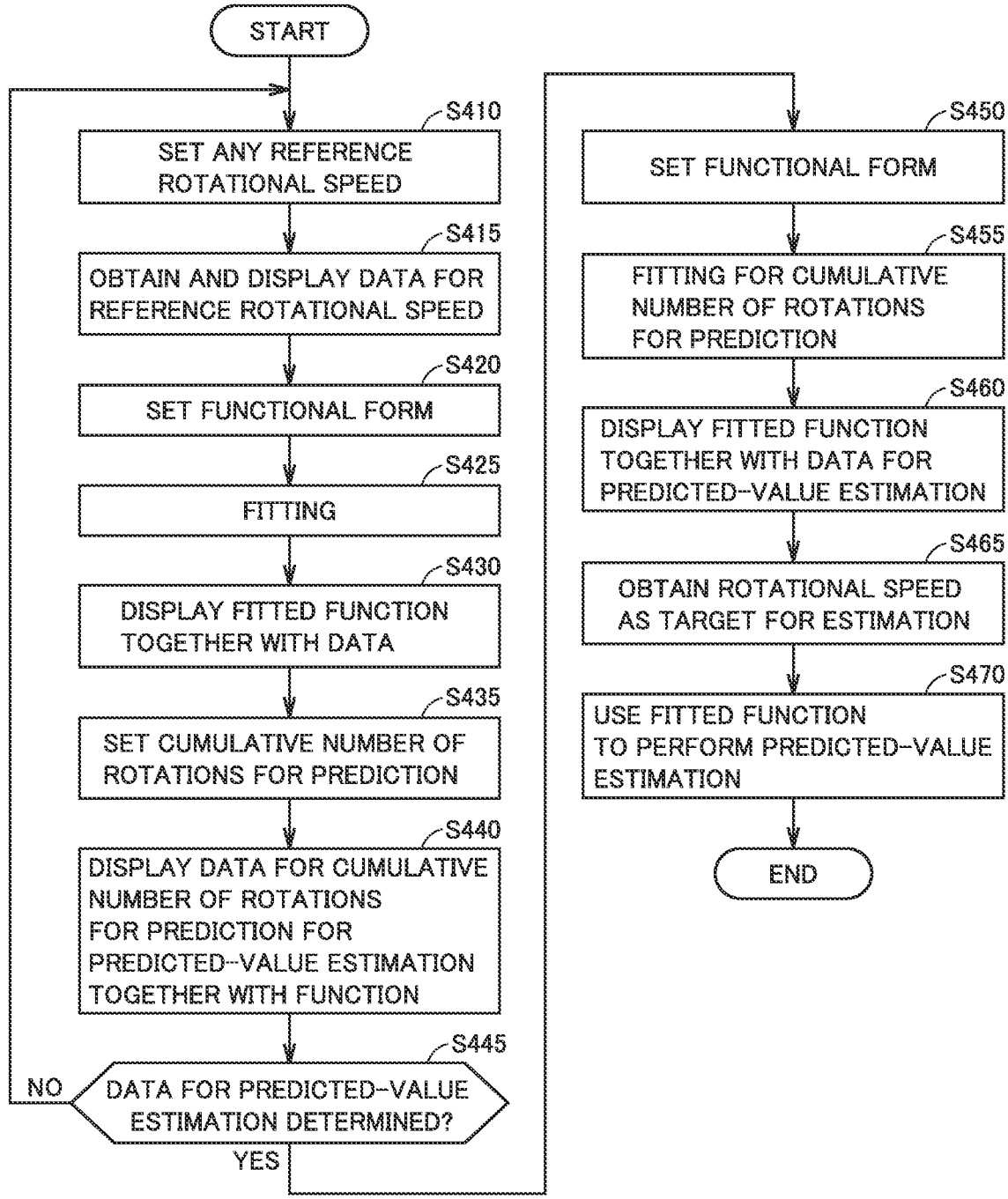

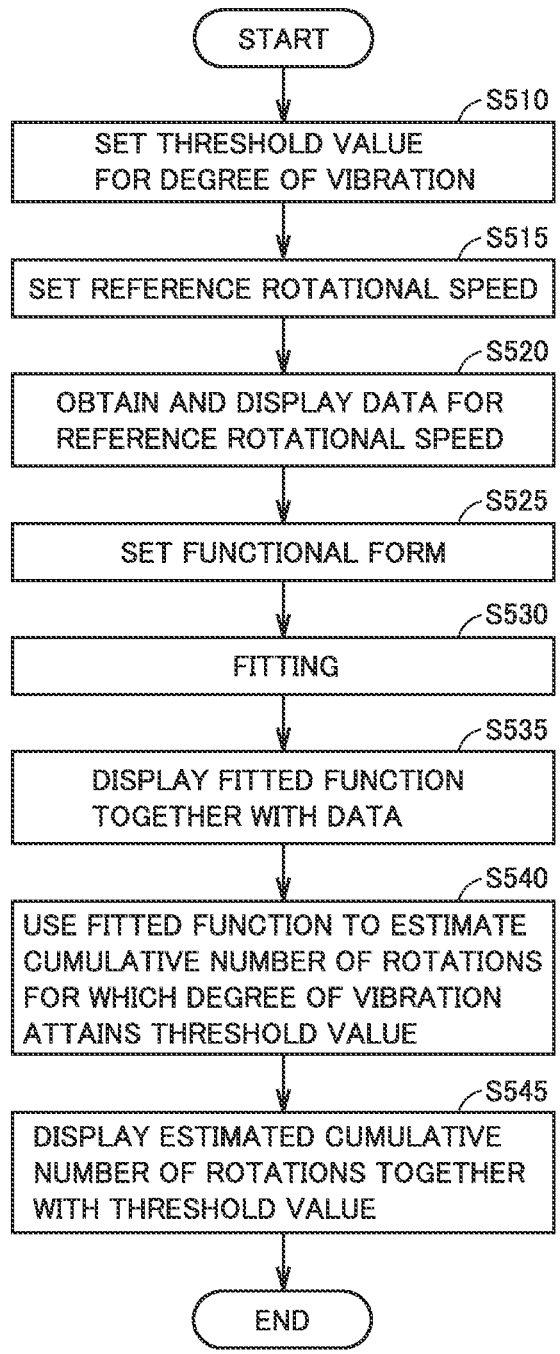

CONDITION MONITORING SYSTEM AND WIND POWER GENERATION SYSTEM INCLUDING THE SAME

CROSS-REFERENCE OF RELATED APPLICATIONS

This application is a U.S. Continuation of International Patent Application No. PCT/JP2020/010213, filed on Mar. 10, 2020, which in turn claims the benefit of Japanese Application No. 2019-069662, filed on Apr. 1, 2019, the entire disclosures of which Applications are incorporated by reference herein.

TECHNICAL FIELD

The present invention relates to a condition monitoring system and a wind power generation system comprising the same, and more specifically to a condition monitoring system capable of monitoring a condition of an apparatus that is a constituent of a wind power generation facility or the like and a wind power generation system employing the same.

BACKGROUND ART

Japanese Patent Laid-Open No. 2013-185507 discloses a condition monitoring system (CMS) for monitoring an abnormality of an apparatus provided for a wind power generation facility. The condition monitoring system uses data that satisfies a predetermined operating condition to generate a threshold value used for abnormality diagnosis of the apparatus, and uses the generated threshold value to perform abnormality diagnosis for the apparatus (see PTL 1).

CITATION LIST

Patent Literature

PTL 1: Japanese Patent Laid-Open No. 2013-185507

SUMMARY OF INVENTION

Technical Problem

The condition monitoring system described in PTL 1 does not use data which does not satisfy the operating condition in generating the threshold value, and the system is not fully exploited to monitor the condition of the apparatus (such as for abnormality diagnosis). However, for example, wind power generation and other similar facilities are affected by natural environments, and accordingly, there are also many periods of time for which operating conditions (such as the rotational speed of the main shaft and the amount of power generated by the power generator) are unsatisfied. Therefore, there is a possibility that the above condition monitoring system may not monitor a condition for many periods of time, resulting in delayed condition monitoring (or abnormality diagnosis).

The present invention has been made to address such an issue, and an object of the present invention is to provide a condition monitoring system capable of effectively utilizing measurement data collected under various operating conditions to monitor a condition of an apparatus, and a wind power generation system comprising the condition monitoring system.

Solution to Problem

A condition monitoring system according to the present invention comprises a measurement device and a processor. The measurement device measures a condition of an apparatus provided for a facility. The processor associates measurement data measured by the measurement device with load data representing an operating load of the facility acting at a time when the measurement data is measured and cumulative load data representing a cumulative operating load accumulated up to the time when the measurement data is measured, to generate a data set of the load data, the cumulative load data, and the measurement data for the time when the measurement data is measured.

The present condition monitoring system allows measurement data measured by the measurement device to be associated with cumulative load data that may represent a point in time when the measurement data is measured, and to be also associated with load data obtained at the point in time when the measurement data is measured, to generate a data set of the load data, the cumulative load data, and the measurement data, and the condition monitoring system allows analysis of condition monitoring with an operating load also considered. That is, measurement data is not selected or excluded depending on the facility's operating condition (or operating load), and any collected data (or data set) can be used to monitor a condition of the facility. Thus, the condition monitoring system can effectively use measurement data collected under various operating conditions to monitor the condition of the apparatus.

Further, the above condition monitoring system uses a cumulative load, rather than a data measurement time, and can exclude data obtained for a period of time for which the facility is stopped. As a result, when data interpolation, function fitting, and the like are performed, discontinuity of data can be eliminated to increase accuracy.

Preferably, the processor collects the measurement data and the load data periodically or aperiodically. Furthermore, the processor is further configured to subject a plurality of data sets each generated based on the collected measurement data and load data to data interpolation to generate interpolated three-dimensional data with the cumulative load data, the load data, and the measurement data represented along a first axis, a second axis, and a third axis, respectively.

Preferably, the processor is further configured to: use the interpolated three-dimensional data to calculate a relationship between the load data and the measurement data for any past point in time; and use the calculated past relationship to estimate a relationship between the load data and the measurement data for a current point in time.

Preferably, the processor is further configured to: use the interpolated three-dimensional data to calculate a relationship between the cumulative load data and the measurement data for a plurality of the load data different in magnitude from one another; use a result of the calculation to predict a value of the measurement data for any future point in time for each of the plurality of load data; and use a result of the prediction to estimate a relationship between the load data and the measurement data for the future point in time.

Preferably, the processor is further configured to: use the interpolated three-dimensional data to calculate a relationship between the cumulative load data and the measurement data with the load data set to a predetermined value; and use a result of the calculation to predict a magnitude of the cumulative load data for which the measurement data exceeds a threshold value.

A wind power generation system according to the present invention comprises a wind power generation facility and any one of the condition monitoring systems described above. The condition monitoring system monitors a condition of an apparatus that is a constituent of the wind power generation facility.

Advantageous Effects of Invention

The present invention can thus provide a condition monitoring system capable of effectively utilizing measurement data collected under various operating conditions to monitor a condition of an apparatus, and a wind power generation system comprising the condition monitoring system.

BRIEF DESCRIPTION OF DRAWINGS

FIG. 12 is a diagram for describing an idea of estimating a predicted value.

FIG. 13 is a flowchart of an example of a procedure of a process performed in step S250 of FIG. 9 to estimate a predicted value.

FIG. 14 is a flowchart of an example of a procedure of a process for predicting a future point in time (or a cumulative number of rotations) for which a degree of vibration exceeds a threshold value.

DESCRIPTION OF EMBODIMENTS

Hereinafter reference will be made to the drawings to describe the present invention in an embodiment. In the figures, identical or corresponding components are identically denoted and will not be described repeatedly.

<General Configuration of Condition Monitoring System>

Figure 1:
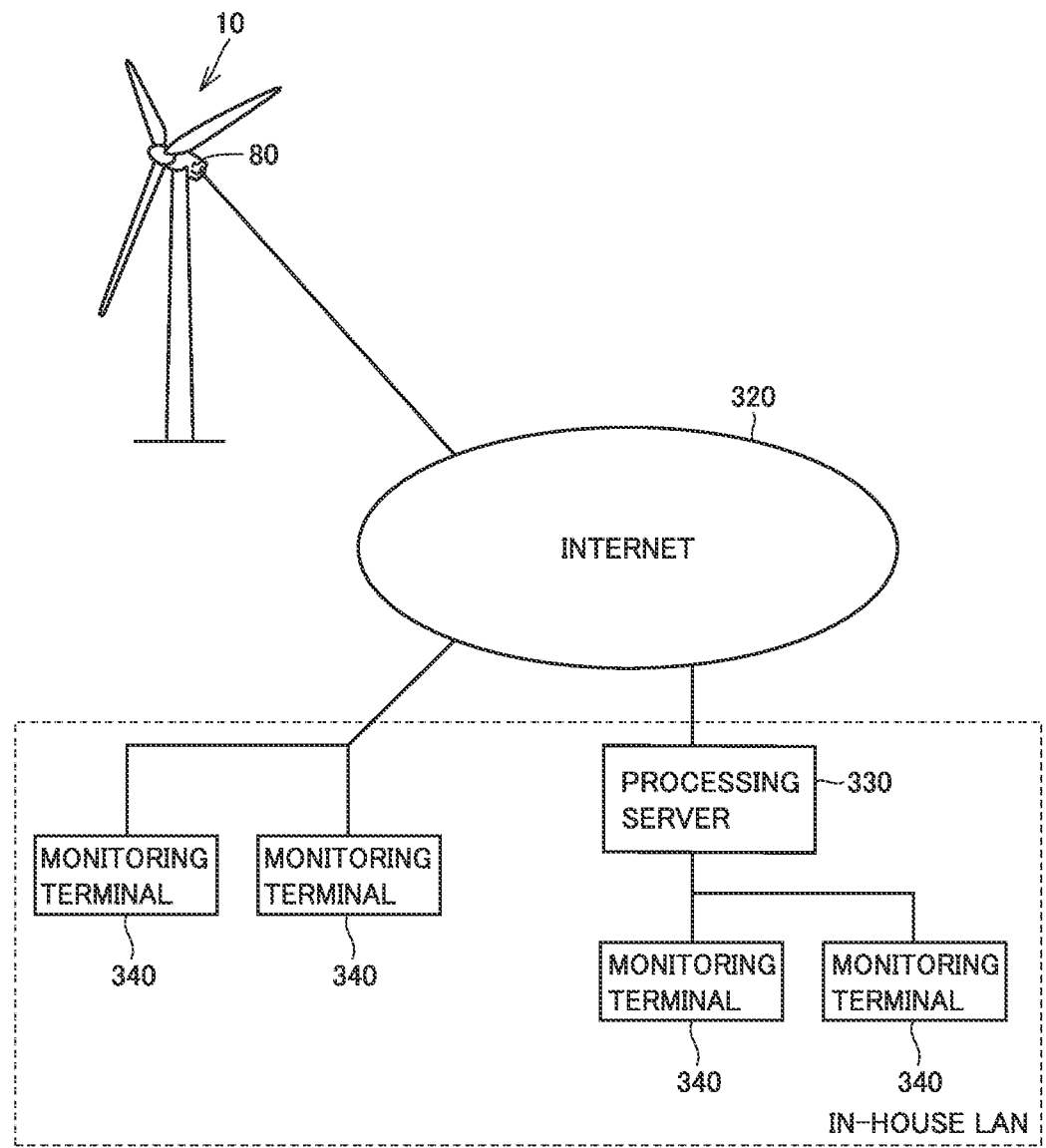
FIG. 1 is a diagram schematically showing an overall configuration of a condition monitoring system according to an embodiment.

FIG. 1 is a diagram generally showing a configuration of a condition monitoring system according to the present embodiment. Referring to FIG. 1, the condition monitoring system includes a measurement device 80, a processing server 330, and a monitoring terminal 340.

Measurement device 80 is provided to a wind power generation facility 10 and calculates an effective value, a peak value, a crest factor, an effective value after envelope processing, a peak value after envelope processing, etc. from sensed values received from a variety of sensors described hereinafter, and transmits them to processing server 330 via the Internet 320. While in this example measurement device 80 and processing server 330 perform communications through a wire, they may do so wirelessly.

Processing server 330 includes a CPU (central processing unit), a ROM (read only memory), a RAM (random access memory), and a communication device for communicating with measurement device 80 of wind power generation facility 10 via Internet 320 (all not shown). The CPU loads a program stored in the ROM into the RAM or the like and executes the program. The program stored in the ROM is a program describing a procedure of a process performed by server 330. The process performed by processing server 330 will be described in detail hereinafter.

Monitoring terminal 340 is connected to processing server 330 for example by an in-house LAN (Local Area Network). Monitoring terminal 340 is provided to display a condition of each apparatus of wind power generation facility 10, browse data analyzed in processing server 330, input and change various settings in processing server 330, and the like.

<Configuration of Wind Power Generation Facility>

Figure 2:
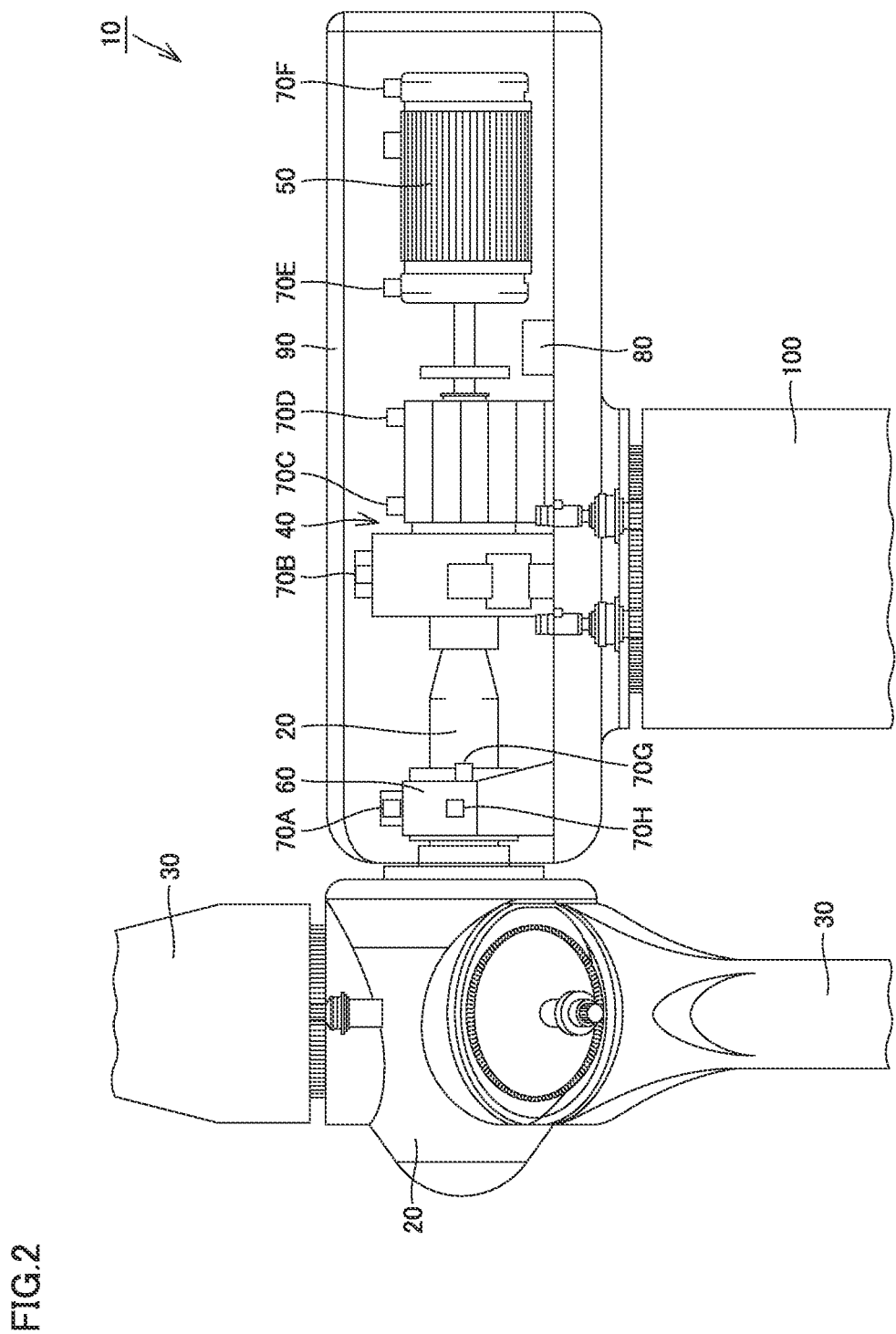
FIG. 2 is a diagram schematically showing a configuration of a wind power generation facility.

FIG. 2 is a diagram schematically showing a configuration of wind power generation facility 10. Referring to FIG. 2, wind power generation facility 10 includes a main shaft 20, a blade 30, a gearbox 40, a power generator 50, a main shaft bearing 60, a nacelle 90, and a tower 100. Wind power generation facility 10 further includes sensors 70A to 70H and a measurement device 80. Gearbox 40, power generator 50, main shaft bearing 60, sensors 70A to 70H, and measurement device 80 are housed in nacelle 90, and nacelle 90 is supported by tower 100.

Main shaft 20 is inserted into nacelle 90, connected to the input shaft of gearbox 40, and is rotatably supported by main shaft bearing 60. And main shaft 20 transmits rotational torque that is generated by blade 30 receiving wind power to the input shaft of gearbox 40. Blade 30 is provided at an end of main shaft 20, converts wind power into rotational torque, and transmits it to main shaft 20.

Main shaft bearing 60 is disposed in nacelle 90 in a fixed manner and supports main shaft 20 rotatably. Main shaft bearing 60 is a rolling bearing, and for example, it is a self-centering roller bearing, a conical roller bearing, a cylindrical roller bearing, a ball bearing, etc. Note that these bearings may be of a single row or double rows.

Sensors 70A-70H are disposed in nacelle 90 at each apparatus in a fixed manner. Specifically, sensor 70A is disposed on main shaft bearing 60 in a fixed manner and monitors a condition of main shaft bearing 60. Sensors 70B-70D are disposed on gearbox 40 in a fixed manner, and monitor a condition of gearbox 40. Sensors 70E and 70F are disposed on power generator 50 in a fixed manner, and monitor a condition of power generator 50. Sensor 70G is disposed on main shaft bearing 60 in a fixed manner, and monitors misalignment, and abnormal vibration of nacelle 90. Sensor 70H is disposed on main shaft bearing 60 in a fixed manner, and monitors unbalance, and abnormal vibration of the nacelle.

Gearbox 40 is provided between main shaft 20 and power generator 50 to increase the rotational speed of main shaft 20 and output the increased rotational speed to power generator 50. As an example, gearbox 40 is composed of a gear speed-up mechanism including a planetary gear, a countershaft, a high speed shaft, etc. Note that although not shown in the figure, gearbox 40 is also provided therein with a plurality of bearings to support a plurality of shafts rotatably. Power generator 50 is connected to the output shaft of gearbox 40, and generates electric power by the rotational torque received from gearbox 40. Power generator 50 is an induction generator, for example. Note that power generator 50 is also provided therein with a bearing to support a rotor rotatably.

Measurement device 80 receives measurement data of each apparatus's vibration, acoustic emission (AE), temperature, operating sound and other measurement data sensed by sensors 70A-70H. Measurement device 80 periodically transmits a variety of types of measurement data to processing server 330 via Internet 320.

The measurement data may be converted into parameters that can better indicate conditions of apparatuses. For example, each measurement data may be converted into an effective value, a peak value, a crest factor, an effective value after envelope processing, a peak value after envelope processing, or the like, and measurement device 80 may transmit the measurement data converted into any one of the above values to processing server 330 via Internet 320. As an example, sensor 70A is a vibration sensor that senses vibration of main shaft bearing 60, and measurement device 80 calculates an effective value of vibration (hereinafter referred to as a "degree of vibration") of main shaft bearing 60 from data measured by sensor 70A, and transmits the degree of vibration to processing server 330.

Measurement device 80 may periodically store the measurement data to a storage device located in measurement device 80 and send the stored measurement data to processing server 330 via Internet 320 in response to a request received from processing server 330.

<Condition Monitoring>

Wind power generation facility 10 is affected by natural environments, and its operating load (such as the rotational speed of the main shaft and the amount of power generated by the power generator) varies. Conventionally, as in the condition monitoring system described in PTL 1, data satisfying a predetermined operating condition has been used to monitor a condition of an apparatus (such as to diagnose abnormality). In other words, measurement data which does not satisfy the operating condition is not used for condition monitoring and a cost of measuring data is wasted, and there is also a possibility that condition monitoring (or abnormality diagnosis) may be delayed.

Accordingly, the condition monitoring system according to the present embodiment allows measurement data measured by measurement device 80 to be associated with cumulative load data that may represent a point in time when the measurement data is measured, and to be also associated with load data obtained at the point in time when the measurement data is measured, to generate a data set of the load data, the cumulative load data, and the measurement data. Such a data set is created whenever data is collected, and a plurality of data sets thus generated is subjected to data interpolation to generate interpolated three-dimensional data with the cumulative load data, the load data, and the measurement data represented along a first axis, a second axis, and a third axis, respectively.

Thus using the interpolated three-dimensional data also considering load data obtained at a point in time when measurement is conducted enables analysis of condition monitoring also considering an operating load of wind power generation facility 10. That is, measurement data is not selected or excluded depending on an operating condition (or an operating load) of wind power generation facility 10, and basically, any measured data (excluding abnormality data, noise and the like) can be used to monitor a condition of wind power generation facility 10.

Thus, although details will be described hereinafter, for example, interpolated three-dimensional data can be used to estimate a relationship between the operating load and the measurement data for a current point in time, and the estimated relationship can be used to estimate measurement data for any operating load at the current point in time (i.e., to estimate a current value). Further, interpolated three-dimensional data can be used to predict a relationship between the operating load and the measurement data for any future point in time, and the predicted relationship can be used to estimate measurement data for any operating load at the future point in time (i.e., to estimate a predicted value). Furthermore, it is also possible to estimate when the measurement data exceeds a threshold value for any operating load (i.e., to estimate a cumulative load). These will be described hereinafter in detail.

Further, the condition monitoring system according to the present embodiment uses a cumulative load, rather than a data measurement time, and can exclude data obtained for a period of time for which wind power generation facility 10 is stopped. As a result, when data interpolation, function fitting, and the like are performed, discontinuity of data can be eliminated to increase accuracy.

Each above process is performed by processing server 330. Hereinafter, the process performed by processing server 330 will be described in detail. In the following description, load data is a rotational speed (in rpm) of main shaft 20 (or blade 30), cumulative load data is a cumulative number of rotations (in times) of main shaft 20 (or blade 30), and measurement data is a degree of vibration of main shaft bearing 60.

Figure 3:
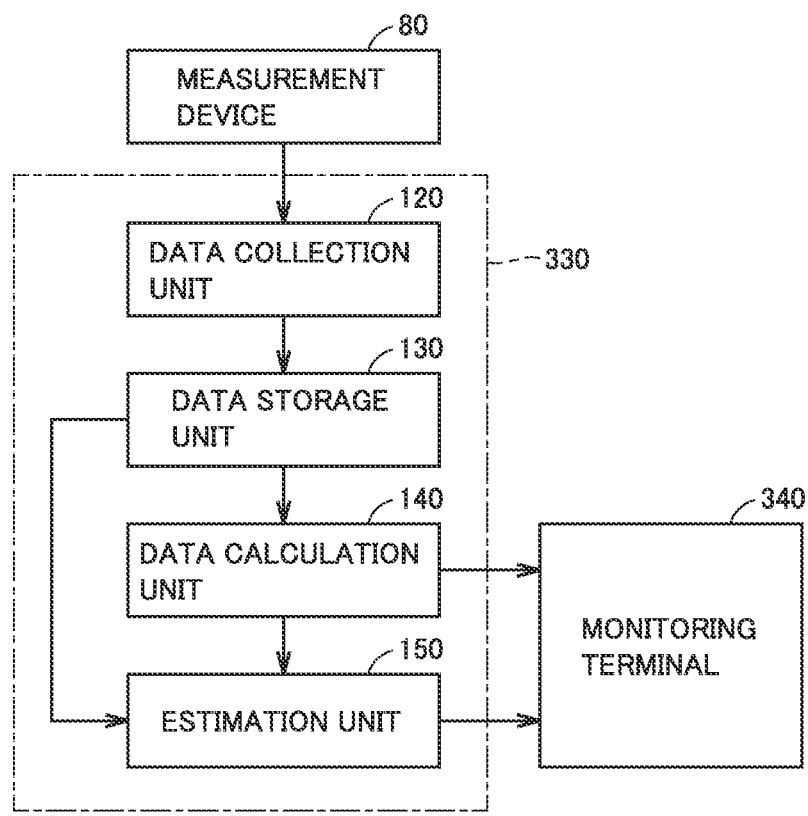
FIG. 3 is a block diagram functionally showing a configuration of a processing server.

FIG. 3 is a block diagram functionally representing a configuration of processing server 330. Referring to FIG. 3, processing server 330 includes a data collection unit 120, a data storage unit 130, a data calculation unit 140, and an estimation unit 150.

Data collection unit 120 periodically collects data of a degree of vibration of main shaft bearing 60 (i.e., measurement data) from measurement device 80 (FIG. 2) via Internet 320. Further, as data collection unit 120 receives the data of the degree of vibration, data collection unit 120 also collects data of a rotational speed of main shaft 20 (i.e., load data) synchronous with the degree of vibration.

Data collection unit 120 stores the data of the degree of vibration received from measurement device 80 to data storage unit 130 in time series together with the data of the rotational speed. Data collection unit 120 may collect the data periodically in an automated manner as described above, or manually by an operator of monitoring terminal 340. When the data is collected manually by the operator, the data is temporarily stored in measurement device 80 of wind power generation facility 10, and in response to a request from the operator, the data stored in measurement device 80 is collectively transmitted to processing server 330 and stored to data storage unit 130.

Data storage unit 130 synchronizes the data of the degree of vibration and that of the rotational speed as collected by data collection unit 120 and thus stores them in time series. Furthermore, data storage unit 130 stores a data set generated by data calculation unit 140, as will be described hereinafter, and interpolated three-dimensional data. Data storage unit 130 is composed for example of a large-capacity storage device such as a hard disk drive (HDD) or a solid state drive (SSD).

Data calculation unit 140 processes the data of the degree of vibration and the rotational speed that are stored in data storage unit 130 to generate a data set of the rotational speed of main shaft 20 (or load data), a cumulative number of rotations (or cumulative load data) of main shaft 20, and the degree of vibration (or measurement data) of main shaft bearing 60. This data set is generated for all collected data. Data calculation unit 140 then uses a plurality of such data sets to generate interpolated three-dimensional data with the cumulative number of rotations, the rotational speed and the degree of vibration represented along a first axis, a second axis, and a third axis, respectively. Hereinafter, the process by data calculation unit 140 will be described in more detail.

Figure 4:
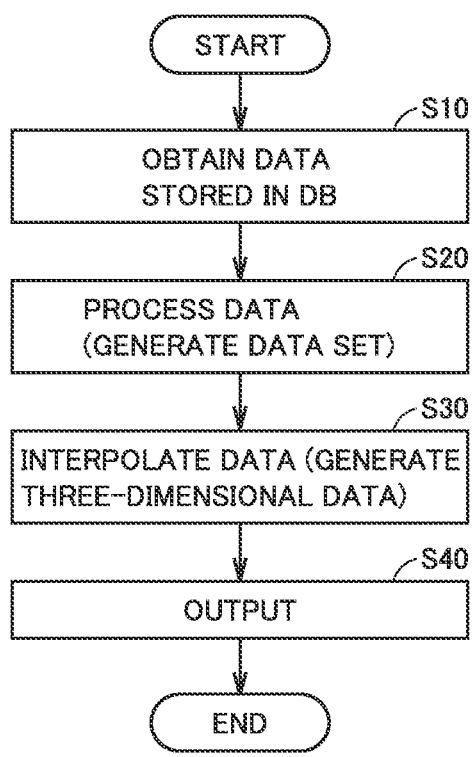
FIG. 4 is a flowchart of an example of a procedure of a process performed in a data calculation unit.

FIG. 4 is a flowchart of an example of a procedure of the process performed in data calculation unit 140. Referring to FIG. 4, data calculation unit 140 obtains data of the degree of vibration and that of the rotational speed that are stored in data storage unit 130 in chronological order (step S10).

Subsequently, whenever data calculation unit 140 obtains such data successively, data calculation unit 140 calculates a cumulative number of rotations from the data of the rotational speed. The data of the rotational speed is data collected periodically as prescribed, and hence regularly, and can be accumulated to calculate a cumulative number of rotations. Data calculation unit 140 associates the calculated cumulative number of rotations with the data of the rotational speed and that of the degree of vibration that are obtained to generate a data set of the rotational speed, the cumulative number of rotations, and the degree of vibration. Whenever data calculation unit 140 obtains data of a degree of vibration and data of a rotational speed from data storage unit 130 successively, data calculation unit 140 processes the data as described above to generate a data set described above (step S20).

Figure 5:
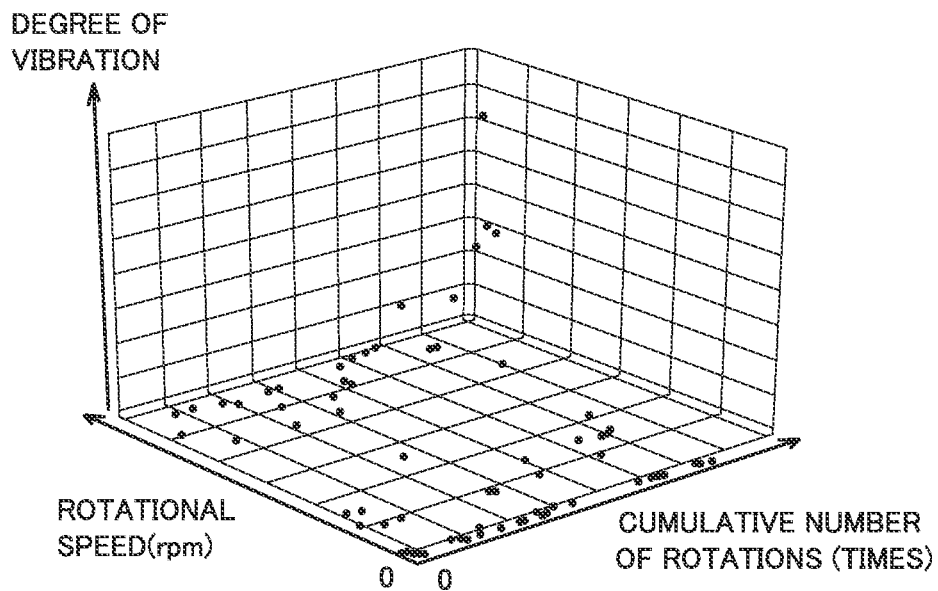
FIG. 5 plots on a three-dimensional graph each data set generated in step S20 of FIG. 4.

FIG. 5 plots on a three-dimensional graph each data set generated in step S20 of FIG. 4. Referring to FIG. 5, a first axis (the X axis) represents the cumulative number of rotations, a second axis (the Y axis) represents the rotational speed, and a third axis (the Z axis) represents the degree of vibration. Each point on the three-dimensional graph represents a value of a data set.

As the first axis represents the cumulative number of rotations, there is no discontinuity appearing if the first axis represents time (that is, there is no period of time that continues for which the rotational speed and the degree of vibration each have a value of approximately 0 while rotation is stopped), and accuracy of data interpolation and function fitting, which will be described hereinafter, can be increased.

Referring again to FIG. 4, data calculation unit 140 performs an interpolation process for each data shown in FIG. 5 to generate interpolated three-dimensional data with the cumulative number of rotations, the rotational speed, and the degree of vibration represented along the first axis, the second axis, and the third axis, respectively (step S30).

Figure 6:
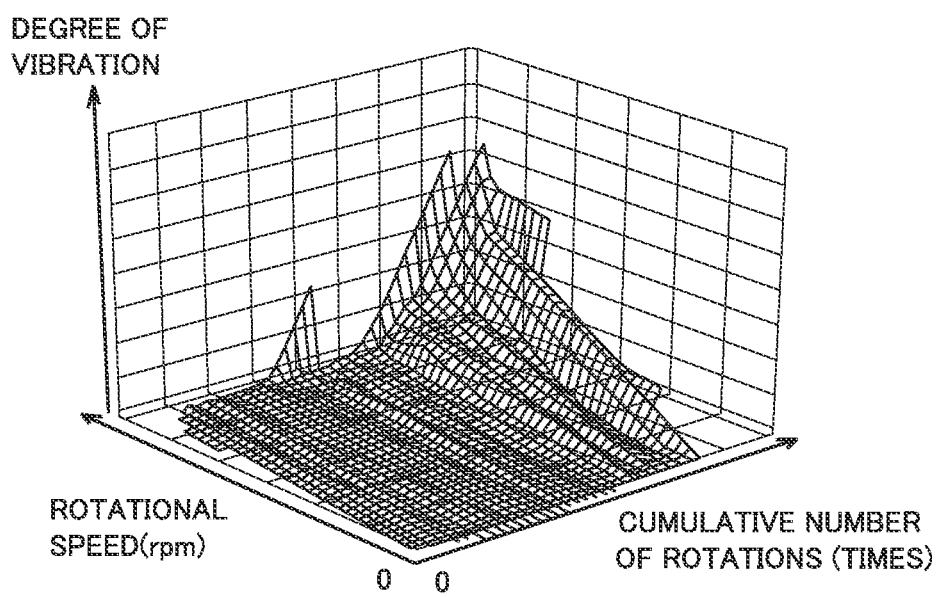
FIG. 6 represents interpolated three-dimensional data generated from each data shown in FIG. 5.

FIG. 6 represents interpolated three-dimensional data generated from each data shown in FIG. 5. Referring to FIG. 6, as well as FIG. 5, the first axis (the X axis) represents the cumulative number of rotations, the second axis (the Y axis) represents the rotational speed, and the third axis (the Z axis) represents the degree of vibration. The method per se employed to interpolate the FIG. 5 scattered data to generate the interpolated three-dimensional data as shown can be a variety of known methods, and for example, polynomial approximation can be employed to interpolate the data.

When additional data is collected by data collection unit 120, data calculation unit 140 updates the interpolated three-dimensional data. In order to reduce a processing load, the interpolated three-dimensional data may not be updated whenever additional data is collected, and it may be updated less frequently, as appropriate.

Referring again to FIG. 4, data calculation unit 140 operates in response to a request received from the operator of monitoring terminal 340 to perform an output process to output a variety of types of data to a screen of monitoring terminal 340 (step S40). By this output process, for example, a diagram in which each data set is plotted, a three-dimensional graph (see FIG. 5) or interpolated three-dimensional data in which data is interpolated (see FIG. 6), and the like can be output to the screen of monitoring terminal 340. Further, based on the interpolated three-dimensional data generated in step S30, the profile of the degree of vibration in any cross section (a YZ plane with a fixed cumulative number of rotations or an XZ plane with a fixed rotational speed) can be output.

Figure 7:
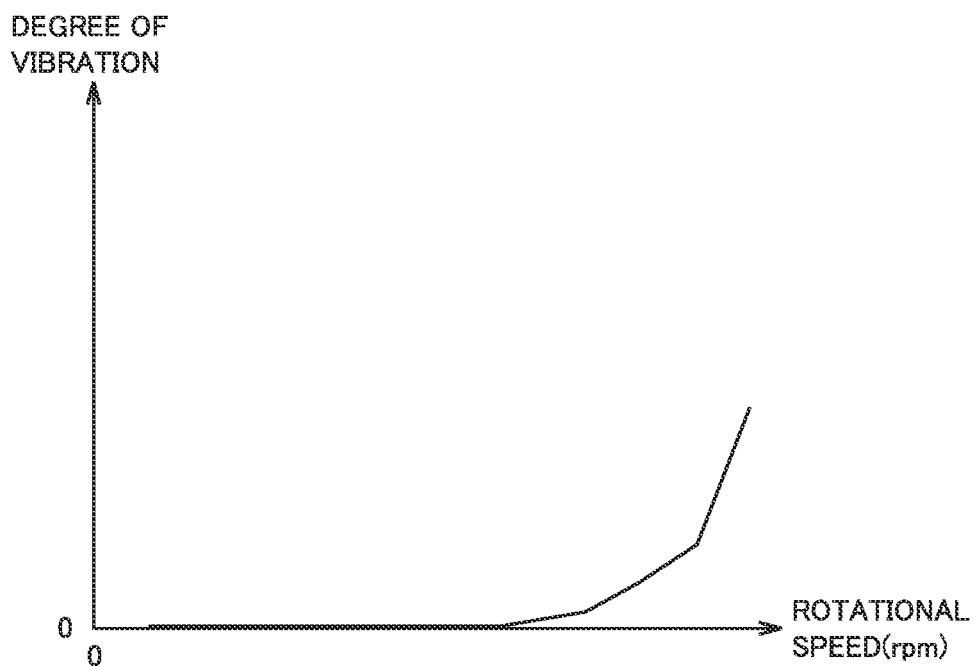
FIG. 7 represents a profile representing a relationship between rotational speed and degree of vibration for some cumulative number of rotations.
Figure 8:
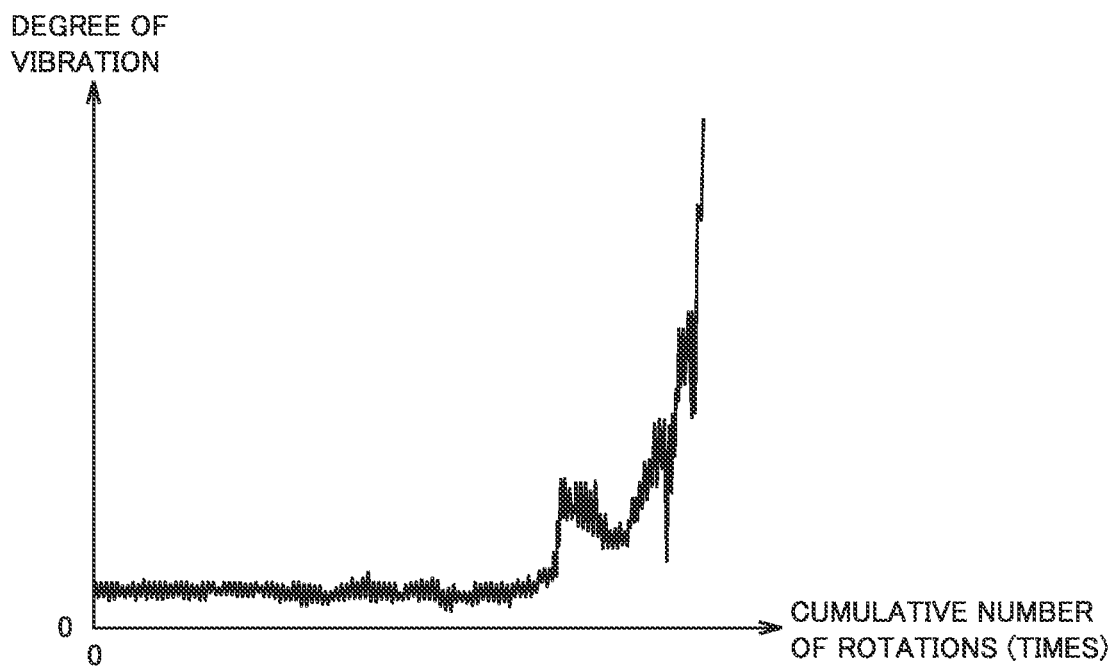
FIG. 8 represents a profile representing a relationship between cumulative number of rotations and degree of vibration for some rotational speed.

FIG. 7 represents a profile representing a relationship between the rotational speed and the degree of vibration for some cumulative number of rotations. FIG. 8 represents a profile representing a relationship between the cumulative number of rotations and the degree of vibration for some rotational speed. Thus, by designating a cumulative number of rotations or a rotational speed, a profile of a degree of vibration for any cross section can be output to the screen of monitoring terminal 340.

Referring to FIG. 3 again, estimation unit 150 is configured to be capable of using the interpolated three-dimensional data generated in data calculation unit 140 to perform a current-value estimation process for estimating a degree of vibration (or measurement data) for any rotational speed (or operating load) at the current point in time (or for the current cumulative number of rotations). Further, estimation unit 150 is configured to be capable of using the above interpolated three-dimensional data to perform a predicted-value estimation process for predicting a degree of vibration for any rotational speed at any future point in time. Hereinafter, the process performed by estimation unit 150 will be described more specifically.

Figure 9:
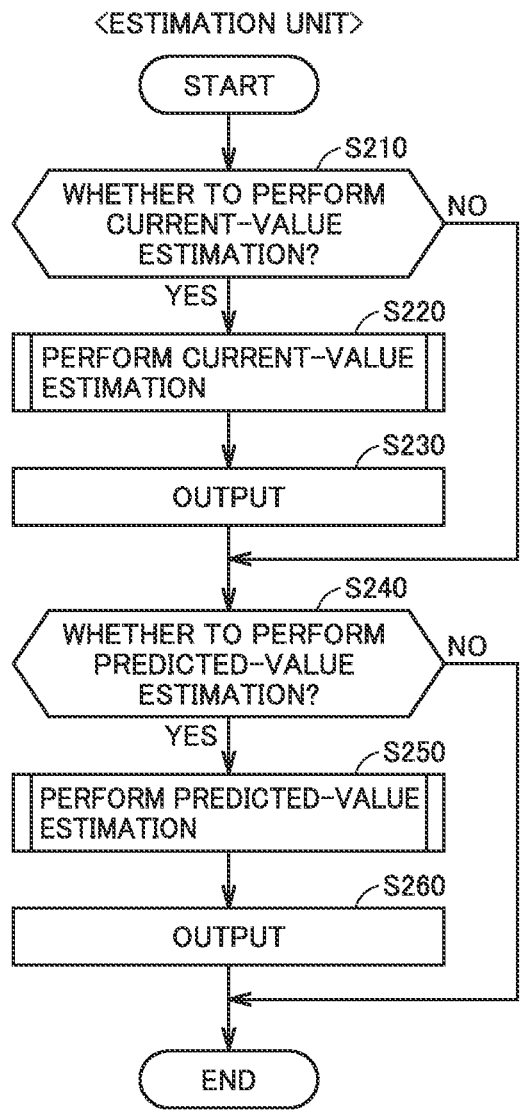
FIG. 9 is a flowchart of an example of a procedure of a process performed in an estimation unit.

FIG. 9 is a flowchart of an example of a procedure of a process performed in estimation unit 150. Referring to FIG. 9, estimation unit 150 determines whether to perform the current-value estimation to estimate a degree of vibration for any rotational speed at the current point in time (step S210). For example, the unit determines to perform the current-value estimation when a request is received from monitoring terminal 340 to do so. For NO in step S210, the process proceeds to step S240.

For YES in step S210, estimation unit 150 performs the current-value estimation process (step S220). Hereinafter, the current-value estimation process will be described in detail.

<Current-Value Estimation Process>

Figure 10:
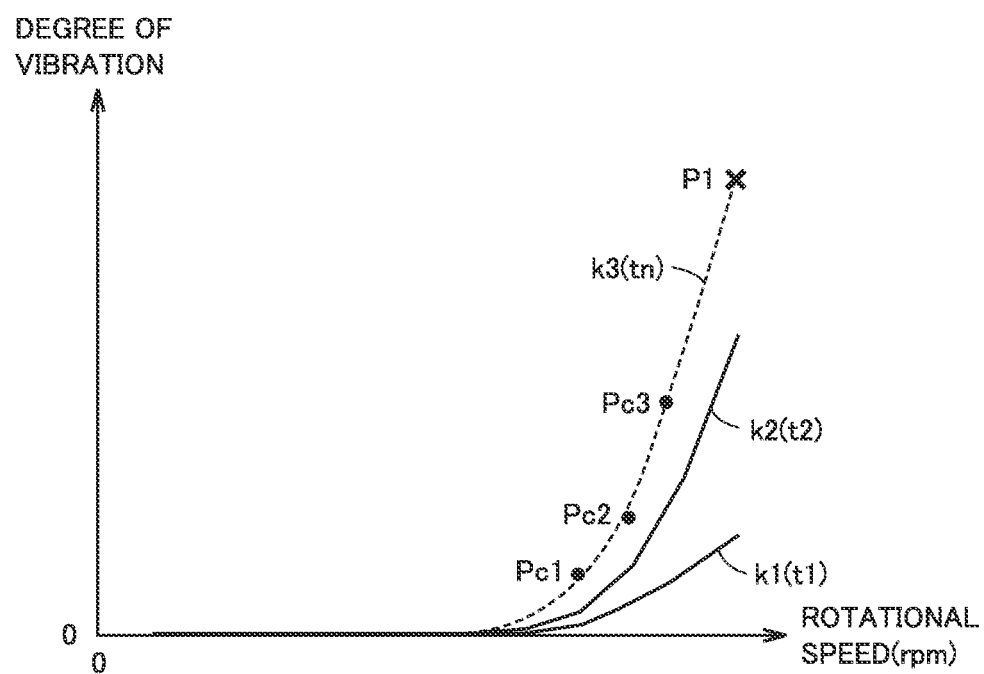
FIG. 10 is a diagram for describing an idea of estimating a current value.

FIG. 10 is a diagram for describing an idea of the current-value estimation. Referring to FIG. 10, the horizontal axis represents rotational speed, and the vertical axis represents degree of vibration. A line k1 shows a profile which is extracted from generated interpolated three-dimensional data and which represents the relationship between the rotational speed and the degree of vibration for any past cumulative number of rotations t1. A line k2 shows a profile which is extracted from the interpolated three-dimensional data and which represents the relationship between the rotational speed and the degree of vibration for any past cumulative number of rotations t2.

A dotted line k3 represents an estimated profile representing the relationship between the rotational speed and the degree of vibration for the current cumulative number of rotations to (or the current point in time). Dotted line k3 is estimated as follows. Initially, a functional form for dotted line k3 is determined based on lines k1 and k2. That is, a functional form for the profile at the current point in time is determined with reference to the shape of a past profile. The function may be a polynomial or employ an exponential function. The functional form is determined by the operator of monitoring terminal 340. The number of past profiles used in determining the functional form is not limited to two profiles (of lines k1 and k2), and may be one or three or more profiles.

And recently obtained data (in this example, Pc1 to Pc3) are used to perform fitting of dotted line k3. Dotted line k3 thus obtained represents a profile representing the relationship between the rotational speed and the degree of vibration for the current cumulative number of rotations to (or the current point in time), and for example allows a degree of vibration (a point P1) for any rotational speed to be estimated at the current point in time.

Figure 11:
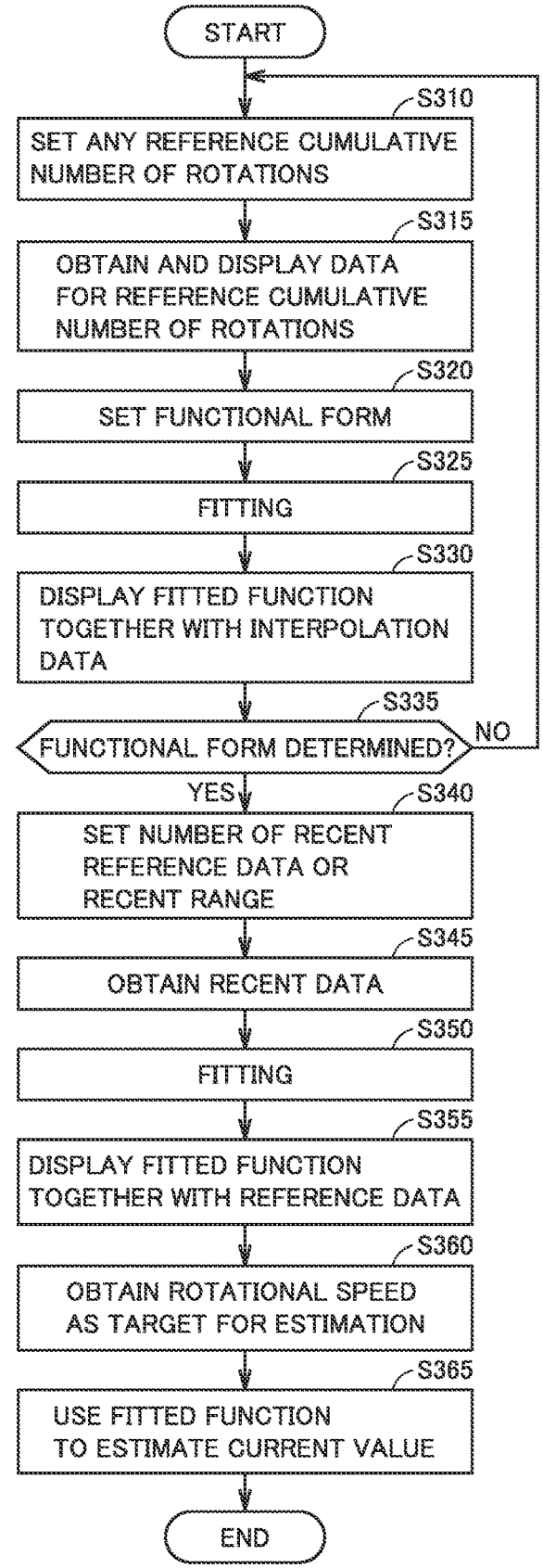
FIG. 11 is a flowchart of an example of a procedure of a process performed in step S220 of FIG. 9 to estimate a current value.

FIG. 11 is a flowchart of an example of a procedure of the current-value estimation process performed in step S220 of FIG. 9. Referring to FIG. 11 together with FIG. 10, estimation unit 150 sets any reference cumulative number of rotations (step S310). The reference cumulative number of rotations is, for example, any past cumulative numbers of rotations t1 and t2 described with reference to FIG. 10, and may be set by the operator of monitoring terminal 340 or may be automatically set by estimation unit 150 as desired.

Subsequently, estimation unit 150 obtains the data (the rotational speed and degree of vibration) for the reference cumulative number of rotations from the interpolated three-dimensional data calculated by data calculation unit 140, and causes monitoring terminal 340 to display the data (step S315).

Then, a functional form is set based on the data displayed in step S315 (step S320). The functional form is set by the operator of monitoring terminal 340. Once the functional form has been set, estimation unit 150 uses the data obtained and displayed in step S315 to fit the function set in step S320 (step S325). Fitting the function can be done for example through least squares.

Thereafter, estimation unit 150 causes monitoring terminal 340 to display the fitted function together with the data used to fit the function (step S330). Estimation unit 150 then determines whether to apply the functional form set in step S320 (step S335). The functional form is actually determined by the operator of monitoring terminal 340, and estimation unit 150 determines that the functional form set in step S320 is applied when monitoring terminal 340 receives an input to determine that the functional form is applied.

If the function is insufficiently fitted and no functional form is determined (NO in step S335), the process returns to step S310, and steps S310 to S330 are performed.

When a functional form is determined in step S335 (YES in step S335), estimation unit 150 sets the number of recent reference data or a recent range (e.g., a range of cumulative numbers of rotations for which the recent reference data is obtained) (step S340). This sets a condition for extracting reference data (in FIG. 10, Pc1 to Pc3) used for fitting dotted line k3 shown in FIG. 10. Estimation unit 150 then obtains recent data (for example, Pc1 to Pc3 in FIG. 10) from data storage unit 130 in accordance with the condition set in step S340 for extraction (step S345).

Subsequently, estimation unit 150 uses the obtained reference data to fit the function determined in step S335 (step S350). In this case as well, for example, fitting the function can be done for example through least squares. Then, estimation unit 150 causes monitoring terminal 340 to display the fitted function together with the reference data used for fitting the function (step S355).

Subsequently, estimation unit 150 obtains a rotational speed as a target for estimation (step S360). The rotational speed as a target for estimation corresponds to the rotational speed of point P1 that is set by the operator of monitoring terminal 340 and for which estimating a degree of vibration is desired, as shown in FIG. 10. Estimation unit 150 uses the fitted function to estimate a degree of vibration for the rotational speed as the target for estimation (i.e., perform the current-value estimation) (step S365).

Referring to FIG. 9 again, when the current-value estimation process is performed in step S220, estimation unit 150 outputs to monitoring terminal 340 an estimation result obtained through the current-value estimation process, that is, a profile of a function representing a relationship between the rotational speed and the degree of vibration for the current point in time (or the current cumulative number of rotations), as well as the rotational speed set as the target for estimation and an estimated value of a degree of vibration for the rotational speed set as the target for estimation (step S230).

Subsequently, estimation unit 150 determines whether to estimate a degree of vibration for any rotational speed at any future point in time (i.e., to perform predicted-value estimation) (step S240). For example, the unit determines to perform the predicted-value estimation when a request is received from monitoring terminal 340 to do so. For NO in step S240, the process ends.

For YES in the step S240, estimation unit 150 performs the predicted-value estimation process (step S250). Hereinafter, the predicted-value estimation process will be described in detail.

<Predicted-Value Estimation Process>

FIG. 12 is a diagram for describing an idea of the predicted-value estimation. Referring to FIG. 12, the horizontal axis represents the rotational speed and the vertical axis represents the degree of vibration. Lines k1 to k3 are the same as those shown in FIG. 10. That is, line k1 shows a profile which is extracted from interpolated three-dimensional data and which represents a relationship between the rotational speed and the degree of vibration for any past cumulative number of rotations t1, and line k2 shows a profile which is extracted from the interpolated three-dimensional data and which represents a relationship between the rotational speed and the degree of vibration for any past cumulative number of rotations t2. A line k3 represents an estimated profile representing a relationship between the rotational speed and the degree of vibration for the current cumulative number of rotations to (or the current point in time).

A dotted line k4 represents an estimated profile representing a relationship between the rotational speed and the degree of vibration for any future cumulative number of rotations (tn+Δt). Dotted line k4 is estimated as follows. Initially, any reference rotational speed is set, and a profile representing the relationship between the cumulative number of rotations and the degree of vibration for the reference rotational speed is obtained from the interpolated three-dimensional data. The obtained profile (or function) is used to predict a degree of vibration for a future cumulative number of rotations (tn+Δt) at the reference rotational speed. Such a degree of vibration for the future cumulative number of rotations (tn+Δt) is predicted for a plurality of reference rotational speeds (Pa1 to Pa4 in FIG. 12).

Then, the predicted degrees of vibration (Pa1 to Pa4) for the future cumulative number of rotations (tn+Δt) are used to fit dotted line k4. A functional form for dotted line k4 is set with reference to lines k1 to k3. Dotted line k4 thus obtained represents a profile representing a relationship between the rotational speed and the degree of vibration for the future cumulative number of rotations (tn+Δt), and for example allows a degree of vibration (a point P2) for any rotational speed to be estimated for the future cumulative number of rotations (tn+Δt).

FIG. 13 is a flowchart of an example of a procedure of the predicted-value estimation process performed in step S250 of FIG. 9. Referring to FIG. 13 together with FIG. 12, estimation unit 150 sets any reference rotational speed (step S410). The reference rotational speed is, for example, a rotational speed for point Pa1 as has been described with reference to FIG. 12, and may be set by the operator of monitoring terminal 340 or may be automatically set by estimation unit 150 as desired.

Subsequently, estimation unit 150 obtains the data (the cumulative number of rotations and degree of vibration) for the reference rotational speed from the interpolated three-dimensional data calculated by data calculation unit 140, and causes monitoring terminal 340 to display the data (step S415).

Then, a functional form is set based on the data displayed in step S415 (step S420). The functional form is set by the operator of monitoring terminal 340. Once the functional form has been set, estimation unit 150 uses the data obtained and displayed in step S415 to fit the function set in step S420 (step S425). Fitting the function can be done for example through least squares.

Thereafter, estimation unit 150 causes monitoring terminal 340 to display the fitted function together with the data used to fit the function (step S430). Subsequently, estimation unit 150 sets a cumulative number of rotations for prediction (tn+Δt) (step S435). The cumulative number of rotations for prediction is set by the operator of monitoring terminal 340 and sets a future point in time for which providing a prediction is desired (i.e., a future cumulative number of rotations).

Then, estimation unit 150 uses the function fitted in step S425 to calculate data indicating a degree of vibration for the cumulative number of rotations for prediction (tn+Δt) for predicted-value estimation, and causes monitoring terminal 340 to display the calculated data together with the function (step S440). The data for predicted-value estimation, as calculated herein, is, for example, point Pa1 shown in FIG. 12.

Subsequently, estimation unit 150 determines whether any data for predicted-value estimation has been determined (step S445). It is necessary to generate data for predicted-value estimation for a plurality of points with the reference rotational speed varied, and a desired number of points is not obtained, it is determined that no data for predicted-value estimation is determined (NO in step S445). In this case, the process returns to step S410, and further data for predicted-value estimation is generated with the reference rotational speed varied.

When it is determined in step S445 that data for predicted-value estimation has been determined (YES in step S445), a functional form is set based on a generated plurality of data for predicted-value estimation (e.g., Pa1 to Pa4 in FIG. 12) (step S450). The functional form is set by the operator of monitoring terminal 340. Once the functional form has been set, estimation unit 150 uses the plurality of data for predicted-value estimation to fit a function for the cumulative number of rotations for prediction that is set in step S435 (step S455). In this case as well, for example, fitting the function can be done for example through least squares.

Then, estimation unit 150 causes monitoring terminal 340 to display the fitted function together with the data used to fit the function for predicted-value estimation (step S460). Subsequently, estimation unit 150 obtains a rotational speed as a target for estimation (step S465). The rotational speed as the target for estimation corresponds to the rotational speed for point P2 that is set by the operator of monitoring terminal 340 and for which estimating a degree of vibration for the cumulative number of rotations for prediction (tn+Δt) is desired, as shown in FIG. 12. Estimation unit 150 uses the fitted function to estimate a degree of vibration for the rotational speed as the target for estimation (i.e., perform the predicted-value estimation) (step S470).

Thus, according to the present embodiment, measurement data is not selected or excluded depending on an operating condition (or load) of wind power generation facility 10, and any collected data (or data set) can be used to monitor a condition of wind power generation facility 10. Thus, measurement data collected under various operating conditions can effectively be used to monitor conditions of a variety of types of apparatuses.

Further, according to the present embodiment, a cumulative load (or a number of rotations), rather than a data measurement time, can be used, and data for a period of time for which wind power generation facility 10 is stopped can be excluded. As a result, when data interpolation, function fitting, and the like are performed, discontinuity of data can be eliminated to increase accuracy.

Further, according to the present embodiment, displaying interpolated three-dimensional data on a three-dimensional graph allows a dangerous condition of wind power generation facility 10 to be confirmed together with an operating load of wind power generation facility 10.

Further, in the present embodiment, generated interpolated three-dimensional data is used to estimate a relationship between an operating load (or a rotational speed) and measurement data (or a degree of vibration) for a current point in time (or a current cumulative number of rotations). Therefore, according to the present embodiment, the estimated relationship can be used to estimate measurement data for any operating load at the current point in time (i.e., to perform current-value estimation).

Further, in the present embodiment, generated interpolated three-dimensional data is used to predict a relationship between an operating load (a rotational speed) and measurement data (a degree of vibration) for any future point in time (or any future cumulative number of rotations). Therefore, according to the present embodiment, the predicted relationship can be used to estimate measurement data for any operating load at the future point in time (i.e., to perform predicted-value estimation).

In the above-described predicted-value estimation, a reference rotational speed may be set, and a future point in time (or a cumulative number of rotations) for which a degree of vibration exceeds a threshold value for that reference rotational speed may be predicted.

FIG. 14 is a flowchart of an example of a procedure of a process for predicting a future point in time (or a cumulative number of rotations) for which a degree of vibration exceeds a threshold value. A series of steps indicated in this flowchart is also performed in estimation unit 150.

Referring to FIG. 14, estimation unit 150 sets a threshold value for the degree of vibration (step S510). The threshold value can be appropriately determined or changed by the operator of monitoring terminal 340, and is used for example to diagnose main shaft bearing 60 for abnormality. Further, estimation unit 150 sets a reference rotational speed (step S515). The reference rotational speed is also set by the operator of monitoring terminal 340, and a cumulative number of rotations when the degree of vibration exceeds the threshold value is predicted for the reference rotational speed.

Steps S520 to S535 are identical to the FIG. 13 steps S415 to S430, respectively. That is, estimation unit 150 obtains the data (the cumulative number of rotations and degree of vibration) for the reference rotational speed from interpolated three-dimensional data, and causes monitoring terminal 340 to display the data (step S520). Subsequently, a functional form is set (step S525), and the data obtained and displayed in step S520 is used to fit of the function set in step S525. Thereafter, estimation unit 150 causes monitoring terminal 340 to display the fitted function together with the data used to fit the function (step S535).

Estimation unit 150 uses the fitted function to predict a cumulative number of rotations for which the degree of vibration set in step S510 is attained (step S540). Then, estimation unit 150 causes monitoring terminal 340 to display the predicted cumulative number of rotations together with the threshold value for the degree of vibration (step S545).

Such a series of steps allows interpolated three-dimensional data generated from collected data to be used to predict when the degree of vibration exceeds the threshold value in the future, (i.e., to predict a cumulative number of rotations).

It should be understood that the embodiments disclosed herein are illustrative and not restrictive in any respect. The scope of the present invention is defined by the terms of the claims, rather than the embodiments described above, and is intended to include any modifications within the meaning and scope equivalent to the terms of the claims.

REFERENCE SIGNS LIST 10 wind power generation facility, 20 main shaft, 30 blade, 40 gearbox, 50 power generator, 60 main shaft bearing, 70A-70H sensor, 80 measurement device, 90 nacelle, 100 tower, 120 data collection unit, 130 data storage unit, 140 data computation unit, 150 estimation unit, 320 Internet, 330 processing server, 340 monitoring terminal.

The invention claimed is:

1. A condition monitoring system comprising:
a measurement device that measures a condition of an apparatus provided for a facility; and
a processor that generates a data set of i) measurement data representing the condition of the apparatus at a time when the measurement device measured the condition of the apparatus, ii) load data representing an operating load of the facility acting at the time when the measurement device measured the condition of the apparatus, and iii) cumulative load data representing a cumulative operating load accumulated up to the time when the measurement device measured the condition of the apparatus,
wherein the processor:
collects the measurement data and the load data periodically or aperiodically; and
performs data interpolation on a plurality of data sets each generated based on the collected measurement data and load data to generate interpolated three-dimensional data using the cumulative load data, the load data, and the measurement data represented along a first axis, a second axis, and a third axis, respectively.

2. The condition monitoring system according to claim 1, wherein the processor further:
uses the interpolated three-dimensional data to calculate a relationship between the load data and the measurement data for any past point in time; and
uses the calculated past relationship to estimate a relationship between the load data and the measurement data for a current point in time.

3. The condition monitoring system according to claim 1, wherein the processor further:
uses the interpolated three-dimensional data to calculate a relationship between the cumulative load data and the measurement data for a plurality of the load data different in magnitude from one another;
uses a result of the calculation to predict a value of the measurement data for any future point in time for each of the plurality of load data; and
uses a result of the prediction to estimate a relationship between the load data and the measurement data for the future point in time.

4. The condition monitoring system according to claim 1, wherein the processor further:
uses the interpolated three-dimensional data to calculate a relationship between the cumulative load data and the measurement data with the load data set to a predetermined value; and
uses a result of the calculation to predict a magnitude of the cumulative load data for which the measurement data exceeds a threshold value.

5. A wind power generation system comprising:
a wind power generation facility; and
a condition monitoring system according to claim 1, wherein
the condition monitoring system monitors a condition of an apparatus that is a constituent of the wind power generation facility.

* * * * *